United States Patent
Kang et al.

(10) Patent No.: US 9,831,689 B2
(45) Date of Patent: Nov. 28, 2017

(54) BATTERY CELL BALANCING METHOD

(71) Applicant: POSTECH ACADEMY-INDUSTRY FOUNDATION, Pohang-si, Gyeongsangbuk-do (KR)

(72) Inventors: Bong Koo Kang, Pohang-si (KR); Kyung Min Lee, Daejeon-si (KR); Yoo Chae Chung, Pohang-si (KR); Chang Hyeon Sung, Daegu-si (KR)

(73) Assignee: POSTECH ACADEMY-INDUSTRY FOUNDATION, Pohang-si, Gyeongsangbuk-do (KR)

(*) Notice: Subject to any disclaimer, the term of this patent is extended or adjusted under 35 U.S.C. 154(b) by 160 days.

(21) Appl. No.: 15/064,831

(22) Filed: Mar. 9, 2016

(65) Prior Publication Data
US 2016/0276847 A1  Sep. 22, 2016

(30) Foreign Application Priority Data
Mar. 20, 2015 (KR) .......... 10-2015-0039161

(51) Int. Cl.
*H02J 7/14* (2006.01)
*H02J 7/00* (2006.01)

(52) U.S. Cl.
CPC .......... *H02J 7/0014* (2013.01); *H02J 7/0021* (2013.01)

(58) Field of Classification Search
CPC .............................. H02J 7/0014; H02J 7/0021
USPC .................. 320/112, 119, 120, 125, 136, 160
See application file for complete search history.

(56) References Cited

U.S. PATENT DOCUMENTS

| | | | | |
|---|---|---|---|---|
| 5,656,915 A * | 8/1997 | Eaves | ................ | H01M 10/482 320/118 |
| 6,750,631 B2 * | 6/2004 | Perelle | ................ | B60L 3/0046 320/112 |
| 8,417,391 B1 * | 4/2013 | Rombouts | ............ | G05B 13/02 700/286 |
| 8,571,720 B2 * | 10/2013 | Yonezawa | ................ | H02J 3/14 700/291 |
| 9,774,206 B2 * | 9/2017 | Kim | ........................ | H02J 7/007 |
| 2002/0195994 A1 * | 12/2002 | Perelle | ................ | H02J 7/0042 320/114 |

(Continued)

FOREIGN PATENT DOCUMENTS

KR  10-2009-0073811  7/2009
KR  10-2014-0128468  11/2014

(Continued)

OTHER PUBLICATIONS

Li H et al., Chinese Patent Document No. CN 204012842, published Dec. 10, 2014, abstract only and 1 figure.*

*Primary Examiner* — Phallaka Kik
(74) *Attorney, Agent, or Firm* — Kile Park Reed & Houtteman PLLC (57) ABSTRACT

The present invention relates to a method for more efficiently performing a balancing operation for a plurality of battery cells of which charges are not equal, in a battery cell balancing circuit using an LC series resonant circuit. The method may include calculating balancing charge for all battery cells of which the charges are not equal, selecting the strongest battery cell storing the highest charge and the weakest battery cell corresponding to the strongest battery cell, among the entire battery cells, and performing a series of balancing operations.

11 Claims, 9 Drawing Sheets

(56) References Cited

U.S. PATENT DOCUMENTS

| | | | |
|---|---|---|---|
| 2004/0257042 A1* | 12/2004 | Liu | H01M 10/441 320/130 |
| 2005/0007074 A1* | 1/2005 | Koster | G01R 31/3637 320/135 |
| 2006/0022639 A1* | 2/2006 | Moore | H02J 7/0016 320/116 |
| 2007/0257642 A1* | 11/2007 | Xiao | H02J 7/0026 320/134 |
| 2009/0027006 A1* | 1/2009 | Vezzini | H02J 7/0014 320/118 |
| 2009/0243543 A1* | 10/2009 | Kawana | H02J 7/0016 320/118 |
| 2010/0194339 A1* | 8/2010 | Yang | H02J 7/0016 320/116 |
| 2011/0025258 A1* | 2/2011 | Kim | H02J 7/0013 320/106 |
| 2011/0050169 A1* | 3/2011 | Akiba | H02J 7/0016 320/109 |
| 2012/0293129 A1* | 11/2012 | Naghshtabrizi | H02J 7/0016 320/118 |
| 2013/0026989 A1* | 1/2013 | Gibbs | H01M 10/441 320/116 |
| 2013/0127423 A1* | 5/2013 | Liang | H01M 10/443 320/136 |
| 2014/0079963 A1* | 3/2014 | Takeuchi | H02J 7/0016 429/52 |
| 2014/0306662 A1* | 10/2014 | Kim | H02J 7/0016 320/118 |
| 2015/0303728 A1* | 10/2015 | Miura | H01M 10/48 320/119 |
| 2015/0340886 A1* | 11/2015 | Sung | H01M 10/441 320/118 |
| 2016/0001673 A1* | 1/2016 | Smidebrant | B60L 11/1803 320/118 |

FOREIGN PATENT DOCUMENTS

| | | |
|---|---|---|
| KR | 10-2015-0004035 | 1/2015 |
| KR | 10-2015-0013302 | 2/2015 |

* cited by examiner

Weakest Cells

Strongest Cells

BATTERY CELL BALANCING METHOD

BACKGROUND

1. Technical Field

The present disclosure relates to a balancing technology of a battery cell module, and more particularly, a battery cell balancing method which is capable of balancing a plurality of battery cells of which the stored charges are not equal, in a battery cell balancing circuit using LC series resonance circuit.

2. Related Art

In general, when a voltage across a battery cell exceeds a predetermined value, the battery cell is likely to explode, and when the voltage falls below a predetermined value, the battery cell is likely to receive permanent damage. Since a hybrid electric vehicle or notebook computer requires a power supply with a relatively large capacity, a battery cell module (battery pack) including a plurality of battery cells connected in series is used to supply power. However, when such a battery cell module is used, a voltage imbalance may occur due to a difference in performance among the battery cells.

When one battery cell within the battery cell module reaches the upper limit voltage before the other battery cells while the battery cell module is charged, the battery cell module cannot be charged any more. Thus, the charging operation must be ended in a state where the other battery cells are not sufficiently charged. In this case, the charge capacity of the battery cell module may not reach the rated charge capacity.

Furthermore, when one battery cell within the battery cell module reaches the lower limit voltage before the other battery cells while the battery cell module is discharged, the battery cell module cannot be used any more. Thus, the use time of the battery cell module is reduced as much.

Therefore, when the battery cell module is charged or discharged, the electrical energy of a battery cell having relatively high electrical energy may be supplied to another battery having relatively low electrical energy, in order to improve the use time of the battery cell module. Such an operation is referred to as battery cell balancing.

Figure 1:
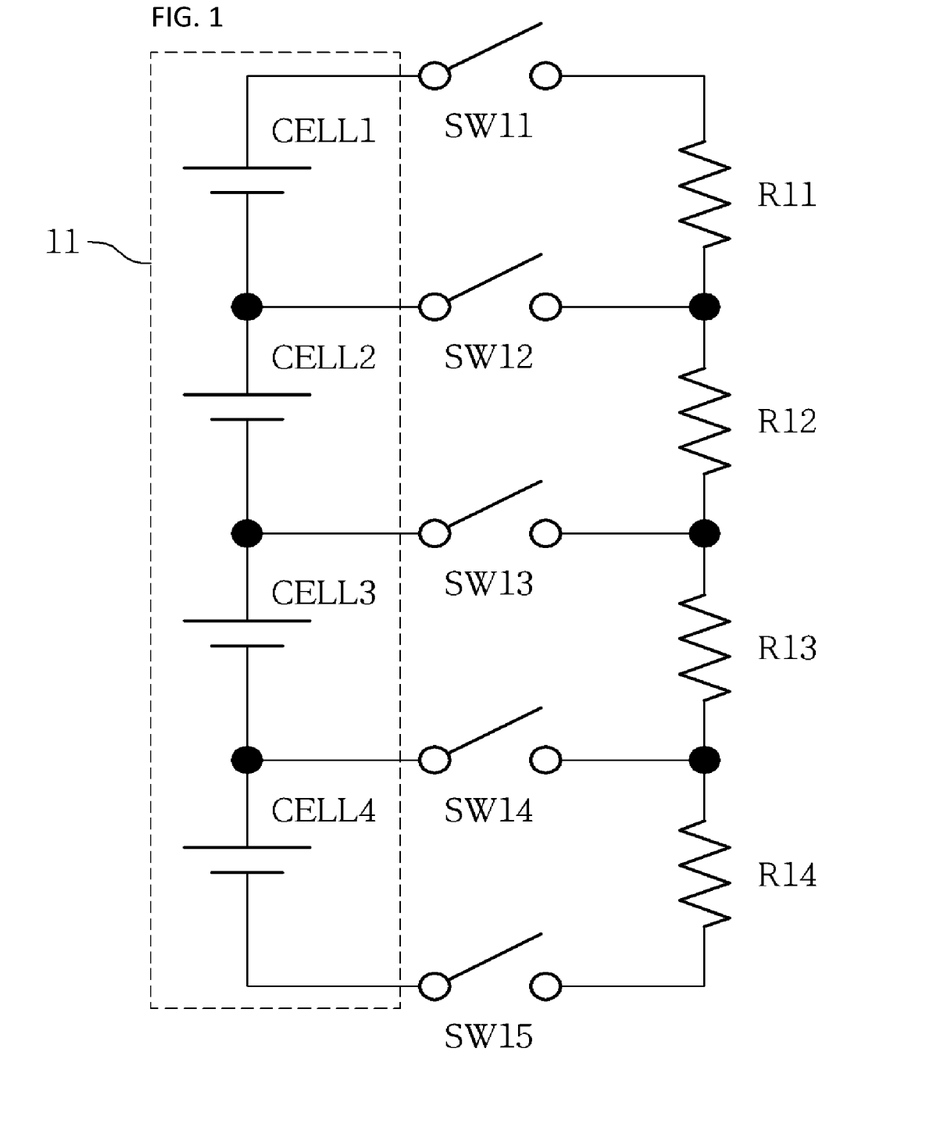
FIG. 1 is a circuit diagram of a conventional battery cell balancing circuit using parallel resistors.

FIG. 1 is a circuit diagram of a conventional battery cell balancing circuit using parallel resistors. As illustrated in FIG. 1, the conventional battery cell balancing circuit includes a battery module 11 including battery cells CELL1 to CELL4 connected in series, resistors R11 to R14 connected in series, and switches SW11 to SW15 configured to selectively connect the battery cells CELL to CELL4 of the battery module 11 to the resistors R11 to R14.

Referring to FIG. 1, when the charge voltage of an arbitrary battery cell among the battery cells CELL1 to CELL4 within the battery module 11 reaches the upper limit voltage before the charge voltages of the other battery cells while the battery module 11 is charged, the corresponding switch among the switches SW11 to SW15 is turned on to discharge the battery cell through the corresponding resistor among the resistors R11 to R14.

Figure 2:
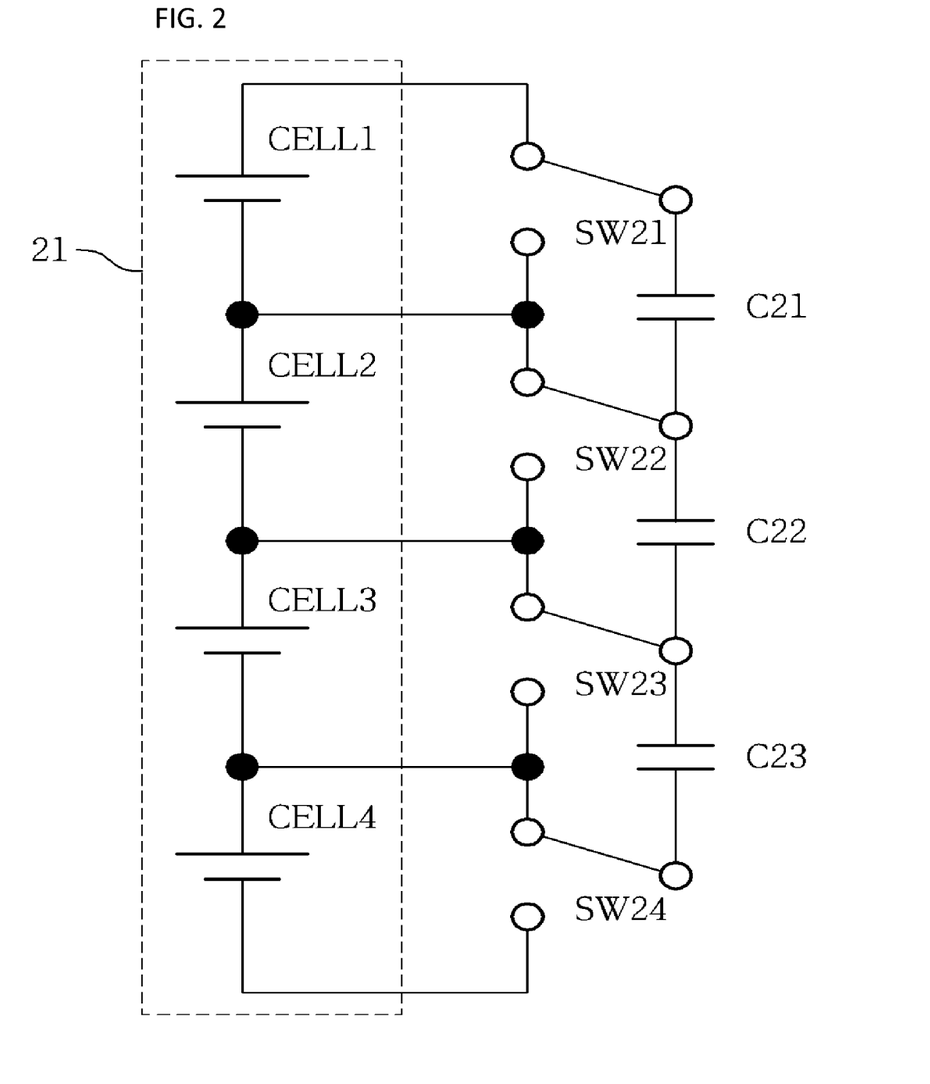
FIG. 2 is a circuit diagram of a conventional battery cell balancing circuit using capacitors.

FIG. 2 is a circuit diagram of a conventional battery cell balancing circuit using capacitors. As illustrated in FIG. 2, the conventional battery cell balancing circuit includes a battery module 21 including battery cells CELL1 to CELL4 connected in series, capacitors C21 to C23 connected in series, and switches SW11 to SW15 configured to selectively connect the capacitors C21 to C23 to the battery cells CELL to CELL4.

Referring to FIG. 2, the battery cell balancing circuit using the capacitors has two kinds of connection states. In a first connection state, one terminal of the capacitor C21, a connection terminal between the capacitors C21 and C22, a connection terminal between the capacitors C22 and C23, and the other terminal of the capacitor C23 are connected to one terminals (anode terminals) of the battery cells CELL1 to CELL4, respectively, as illustrated in FIG. 2. In a second connection state, the one terminal of the capacitor C21, the connection terminal between the capacitors C21 and C22, the connection terminal between the capacitors C22 and C23, and the other terminal of the capacitor C23 are connected to the other terminals (cathode terminals) of the battery cells CELL1 to CELL4, respectively.

Figure 3:
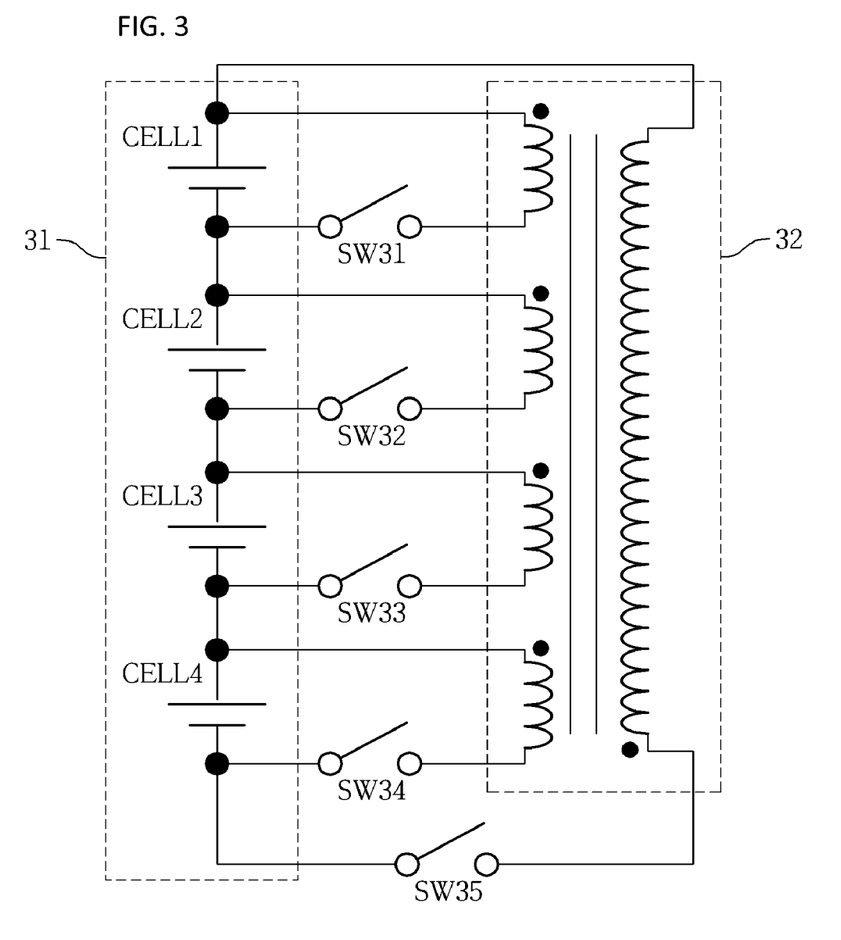
FIG. 3 is a circuit diagram of a conventional battery cell balancing circuit using a flyback structure.

FIG. 3 is a circuit diagram of a conventional battery cell balancing circuit using a flyback structure. As illustrated in FIG. 3, the conventional battery cell balancing circuit includes a battery module 31 including battery cells CELL1 to CELL4 connected in series, a flyback converter 32, and switches SW31 to SW35 configured to selectively connect a plurality of secondary coils of the flyback converter 32 to the battery cells CELL to CELL4, respectively.

The battery cell balancing circuit of FIG. 3 is a battery cell balancing circuit using a flyback structure which is one of switch mode power supplies (SMPS). The battery cell balancing circuit can transfer electrical energy to the battery cells CELL1 to CELL4 connected in series within the battery module 31 using the switches SW31 to SW34, and transfer electrical energy between both terminals of the battery module 31.

However, the conventional battery cell balancing circuit is configured to repeat an operation of recovering charge from the battery cell storing the highest charge and supplying the recovered charge to the battery cell storing the lowest charge.

Thus, when there exist a plurality of battery cells of which the stored charges are not equal, the conventional battery cell balancing circuit has difficulties in completing balancing all of the battery cells, and requires a large amount of balancing time, which makes it possible to degrade the efficiency of the balancing operation.

SUMMARY

Various embodiments are directed to a battery cell balancing method which calculates balancing charge for all battery cells of which the charges are not equal in a battery cell balancing circuit using LC series resonance, and performs a series of balancing operations using the balancing charge, thereby improving balancing efficiency.

In an embodiment, a battery cell balancing method may include: (a) comparing a standard deviation for charges of the entire battery cells to a threshold, and proceeding to the next step or an idle mode according to the comparison result; (b) calculating balancing charge which serves as a reference value when a balancing operation is performed on the entire battery cells, based on the charges of the entire battery cells and charge transfer efficiency of a balancing circuit; (c) calculating a balancing time of a strong battery cell to supply charge and a balancing time of a weak battery cell to receive charge according to a comparison result between a difference between the charge of the strong battery cell storing the highest charge and the balancing charge and a difference between the charge of the weak battery cell storing the lowest charge and the balancing charge, among the charges of the entire battery cells, and performing a balancing operation; and (d) calculating the charge of the strong battery cell and the charge of the weak battery cell, sorting the entire battery cells based on the charges, and returning to the step (c) or (a) according to whether the charge of the strong battery cell and the charge of the weak battery cell among the charges of the sorted battery cells are equal to each other.

DETAILED DESCRIPTION

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Figure 4:
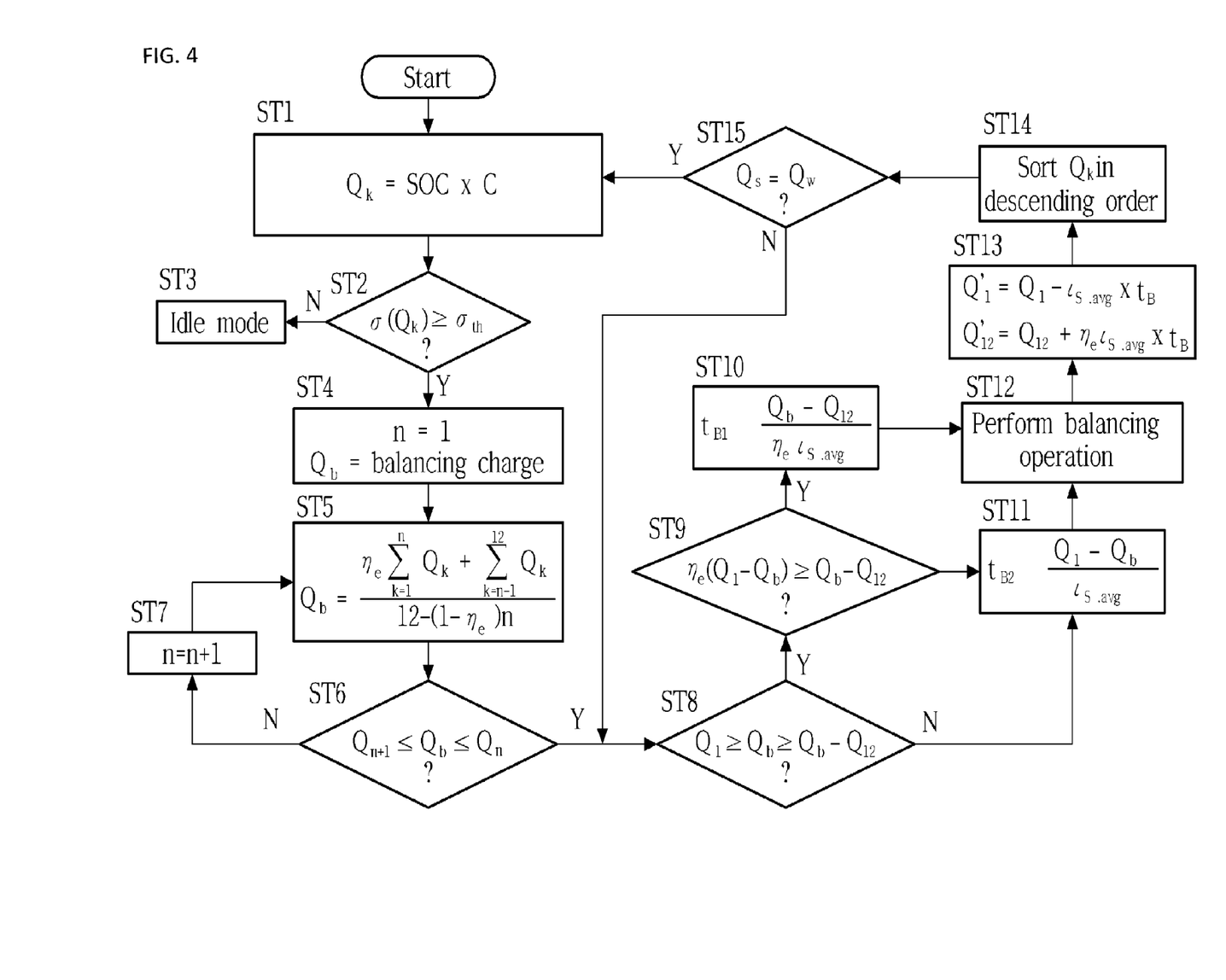
FIG. 4 is a signal flowchart of a battery cell balancing method according to an embodiment of the present invention.

FIG. 4 is a signal flowchart of a battery cell balancing method according to an embodiment of the present invention. As illustrated in FIG. 4, the battery cell balancing method includes a balancing determination process ST1 to ST3, a balancing charge calculation process ST4 to ST7, a balancing process ST8 to ST12, and a balancing termination determination process ST13 to ST15.

Figure 5:
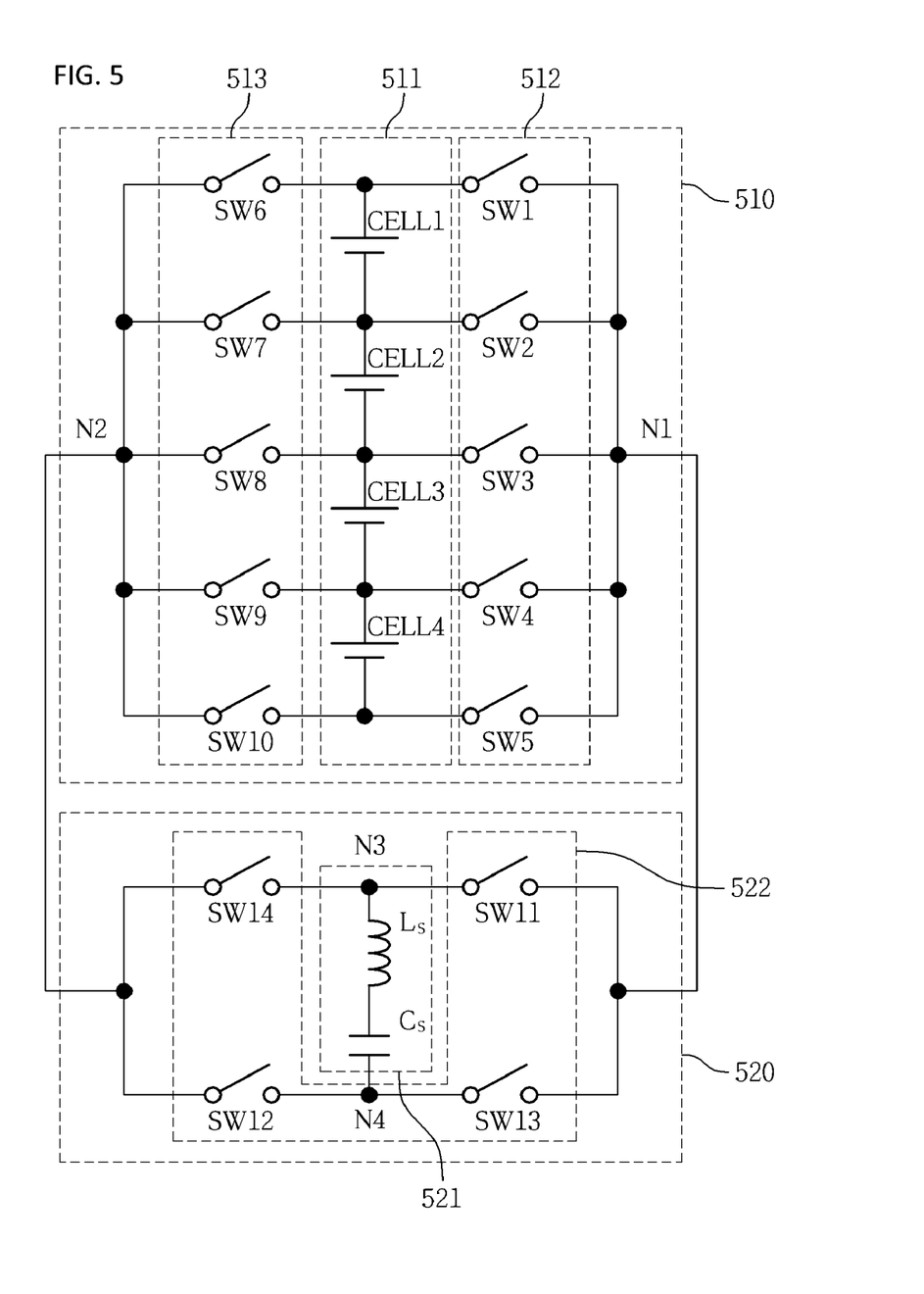
FIG. 5 is a circuit diagram of a battery cell balancing circuit using LC series resonance, to which the battery cell balancing method according to the embodiment of the present invention is applied.

FIG. 5 is a circuit diagram of a battery cell balancing circuit using LC series resonance, to which the battery cell balancing method according to the embodiment of the present invention is applied. As illustrated in FIG. 5, the battery cell balancing circuit includes a battery cell module unit 510 and a series resonant circuit unit 520. The battery cell module unit 510 includes a battery cell module 511, a first switch unit 512, and a second switch unit 513, and the series resonant circuit unit 520 includes a series resonant circuit 521 and a third switch unit 522.

Charge stored in an arbitrary battery cell among the battery cells CELL1 to CELL4 of the battery cell module 511 is temporary stored in a capacitor Cs of the series resonant circuit 521 through the switch units 512, 513, and 522, and then supplied to an arbitrary battery cell among the battery cells CELL1 to CELL4 through the switch units, in order to charge the battery cell.

For example, when the battery cell CELL3 among the battery cell CELL1 to CELL4 has the highest charge value and the battery cell CELL1 has the smallest charge value, a surplus of charge in the charge stored in the battery cell CELL3, based on balancing charge, is temporarily stored in the capacitor Cs of the series resonant circuit 521, and then supplied to the battery cell CELL1. This process will be described as follows. The balancing charge indicates the average charge of the battery cells CELL1 to CELL4.

First, among switches SW1 to SW5 of the first switch unit 512, the switch SW3 is turned on, and the other switches maintain the turn-off state. At this time, among switches SW6 to SW10 of the second switch unit 513, the switch SW9 is turned on, and the other switches maintain the turn-off state. Furthermore, among switches SW11 to SW14 of the third switch unit 522, the switches SW11 and SW12 are turned on, and the other switches maintain the turn-off state. Thus, one terminal of the battery cell CELL3 of the battery cell module 511 is connected to a third common node N3 corresponding to one terminal of the series resonant circuit 521 through the switches SW3 and SW11, and a fourth common node N4 corresponding to the other terminal of the series resonant circuit 521 is connected to the other terminal of the battery cell CELL3 of the battery cell module 511 through the switches SW12 and SW9.

Therefore, the charge stored in the battery cell CELL3 is recovered through the switches SW3 and SW11, and stored in the capacitor Cs of the series resonant circuit 521.

Then, among the switches SW1 to SW5 of the first switch unit 512, the switch SW2 is turned on, and the other switches maintain the turn-off state. At this time, among switches SW6 to SW10 of the second switch unit 513, the switch SW6 is turned on, and the other switches maintain the turn-off state. Furthermore, among switches SW11 to SW14 of the third switch unit 522, the switches SW13 and SW14 are turned on, and the other switches maintain the turn-off state. Thus, the third common node N3 corresponding to the one terminal of the series resonant circuit 521 is connected to one terminal of the battery cell CELL1 of the battery cell module 111 through the switches SW14 and SW6, and the fourth common node N4 corresponding to the other terminal of the series resonant circuit 521 is connected to the other terminal of the battery cell CELL1 of the battery cell module 111 through the switches SW13 and SW2.

Thus, the charge which is temporarily stored in the capacitor Cs of the series resonant circuit 521 is supplied to the battery cell CELL1 of the battery cell module 511 through the switches SW14 and SW6, in order to charge the battery cell CELL1.

Figure 6:
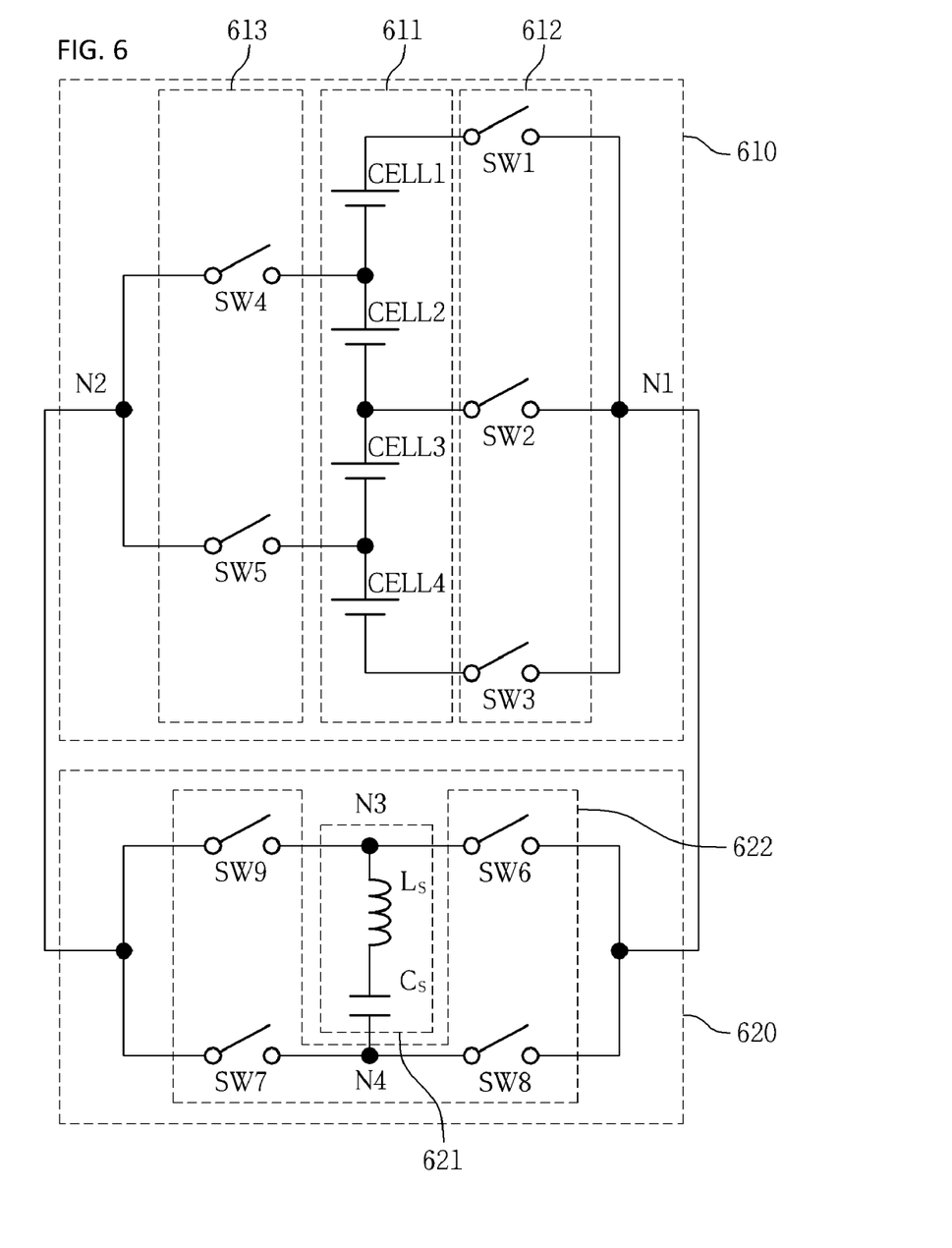
FIG. 6 is a circuit diagram of another battery cell balancing circuit using LC series resonance, to which the battery cell balancing method according to the embodiment of the present invention is applied.

FIG. 6 is a circuit diagram of another battery cell balancing circuit using LC series resonance, to which the battery cell balancing method according to the embodiment of the present invention is applied. As illustrated in FIG. 6, the battery cell balancing circuit is different from the battery cell balancing circuit of FIG. 5 in that the number of switch paths is reduced to the half because the battery cell balancing circuit can be configured to apply a current in both directions of first and second switch units 612 and 613.

For example, a path through which a surplus of charge in the stored charge of a battery cell CELL3, based on the average charge, is recovered may include one terminal of the battery cell CELL3, a switch SW2, a first common node N1, a switch SW6, a series resonant circuit 621, a switch SW7, a second common node N2, a switch SW5, and the other terminal of the battery cell CELL3.

For another example, a path through which charge recovered and stored in a capacitor Cs is supplied to a battery cell CELL4 may include the other terminal of the battery cell CELL4, a switch SW3, the first common node N1, a switch SW8, the series resonant circuit 621, a switch SW9, the second common node N2, the switch SW5, and one terminal of the battery cell CELL4.

Hereafter, referring to FIGS. 7 and 8, the battery cell balancing method according to the embodiment of the present invention will be described in detail. In the present embodiment, the case in which the battery cell balancing method is applied to a battery cell module including 12 battery cells connected in series will be taken as an example for description.

First, charge $Q_k$ stored in a k-th battery cell is calculated by multiplying an SOC (State Of Charge) of the k-th battery cell by a k-th capacity C among the capacities of the batteries, which are sorted in descending order. In this way, the charges of the entire battery cells are calculated at step ST1.

Figure 7:
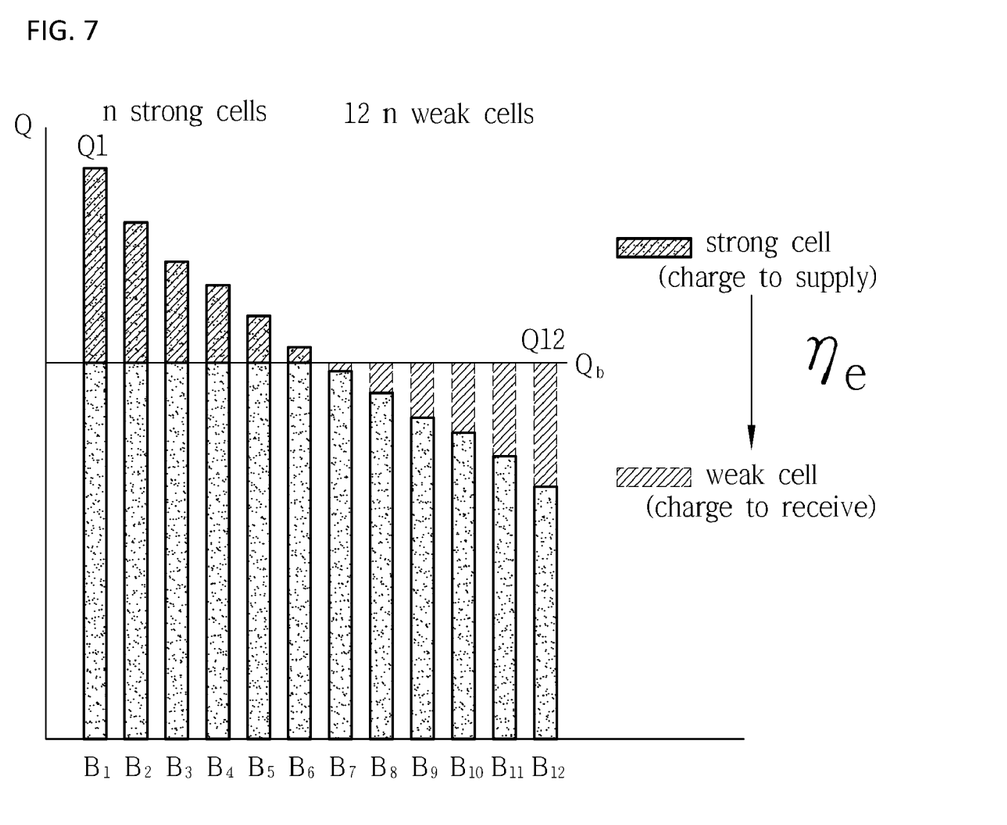
FIG. 7 illustrates an example in which battery cells included in a battery cell module are sorted in order of the charges stored therein.

FIG. 7 illustrates an example in which the battery cells included in the battery cell module, for example, 12 battery cells $B_1$ to $B_{12}$ are sorted in order of the charges stored therein. Referring to FIG. 7, the charge $Q_1$ of the battery cell $B_1$ is the largest, and the charge $Q_{12}$ of the battery cell $B_{12}$ is the smallest. The number of battery cells is not limited to 12, but may be set to m (natural number).

The standard deviation $\sigma(Q_k)$ of the charges $Q_1$ to $Q_{12}$ of the battery cells $B_1$ to $B_{12}$ is calculated and compared to a predetermined threshold $\sigma_{th}$ at step ST2. When the standard deviation $\sigma(Q_k)$ is determined to be equal to or less than the threshold $\sigma_{th}$, the battery cell module is considered to be balanced, and stays in the idle mode. However, when the standard deviation $\sigma(Q_k)$ is determined to exceed the threshold $\sigma_{th}$, the procedure proceeds to the next step, at step ST3.

When an imbalance occurs among the charges $Q_1$ to $Q_{12}$ of the battery cells $B_1$ to $B_{12}$ as illustrated in FIG. 7, the charges of strong battery cells $B_1$ to $B_6$ which store a larger amount of charge than the average charge may be transferred to weak battery cells $B_7$ to $B_{12}$ which store a smaller amount of charge than the average charge, at a charge transfer efficiency of $\eta_e$. The charge transfer efficiency may be expressed as Equation 1 below. The charge transfer efficiency indicates the charge transfer efficiency of the balancing circuit.

$$\left(\sum_{k=1}^{n}(Q_k - Q_b)\right) \times \eta_e = \sum_{k=n+1}^{12}(Q_b - Q_k) \quad \text{[Equation 1]}$$

Equation 1 is used to calculate the balancing charge $Q_b$ corresponding to the average charge which serves as a reference value when a balancing operation is performed for the entire battery cells $B_1$ to $B_{12}$. At this time, when the charges $Q_k$ of the battery cells $B_1$ to $B_{12}$ and the charge transfer efficiency are known, the balancing charge $Q_b$ may be calculated as Equation 2 below, at steps ST4 to ST7.

$$Q_b = \frac{\sum_{k=1}^{n} Q_k \times \eta_e + \sum_{k=n+1}^{12} Q_k}{12 - (1 - \eta_e) \times n} \quad \text{[Equation 2]}$$

That is, the balancing charge $Q_b$ for each of the battery cells $B_1$ to $B_{12}$ is calculated while n is increased by one from 1, and compared to charges $Q_n$ and $Q_{n+1}$. At this time, when the balancing charge $Q_b$ satisfies the condition in which the balancing charge $Q_b$ is smaller than the charge $Q_n$ and larger than the charge $Q_{n+1}$, the calculation operation for the balancing charge $Q_b$ is ended, and the calculated balancing charge $Q_b$ is set to the balancing charge which is to be acquired. For example, when the balancing charge $Q_b$ for each of the battery cells $B_1$ to $B_{12}$ is calculated under the condition in which the charges $Q_1$ to $Q_{12}$ of the battery cells $B_1$ to $B_{12}$ are set as illustrated in FIG. 7, the balancing charge $Q_b$ migrates in the direction from $Q_1$ to $Q_{12}$ whenever n is increased by one. When the balancing charge $Q_b$ is positioned between $Q_6$ and $Q_7$, the calculation operation for the balancing charge $Q_b$ is ended, and the calculated balancing charge $Q_b$ is set to the balancing charge which is to be acquired.

Then, a strong battery cell is selected to perform a strong balancing mode, or a weak battery cell is selected to perform a weak balancing mode.

Figure 8A:
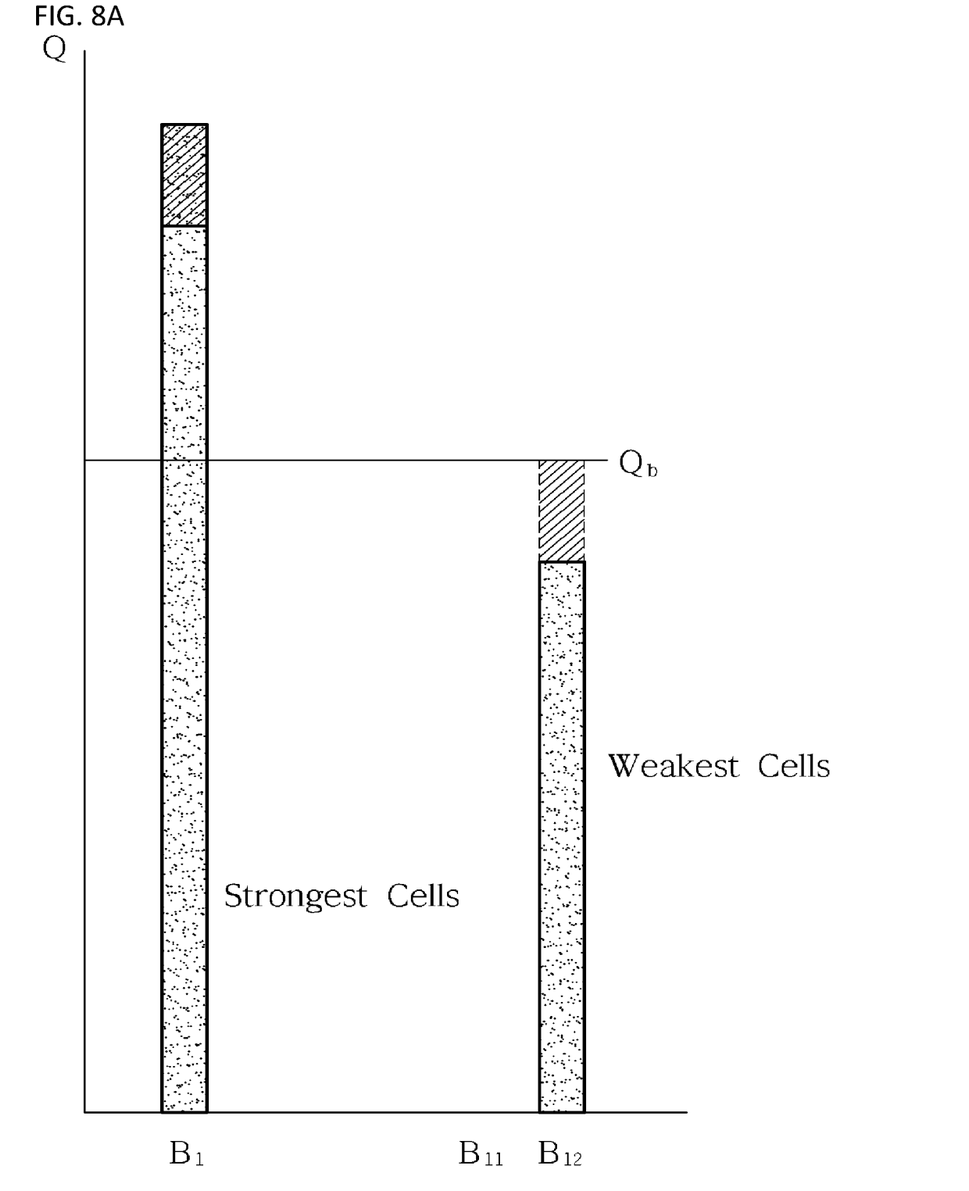
FIG. 8A is a diagram illustrating an example in which charge of an arbitrary weak battery cell is closer to balancing charge than charge of an arbitrary strong battery cell.

For example, when the charge $Q_{12}$ of the weak battery cell (for example, $B_{12}$) is closer to the balancing charge $Q_b$ than the charge $Q_1$ of the strong battery cell (for example, $B_1$) as illustrated in FIG. 8A, the weak balancing mode is selected to perform a balancing operation only until the charge $Q_{12}$ of the weak battery cell $B_{12}$ reaches the balancing charge $Q_b$.

Figure 8B:
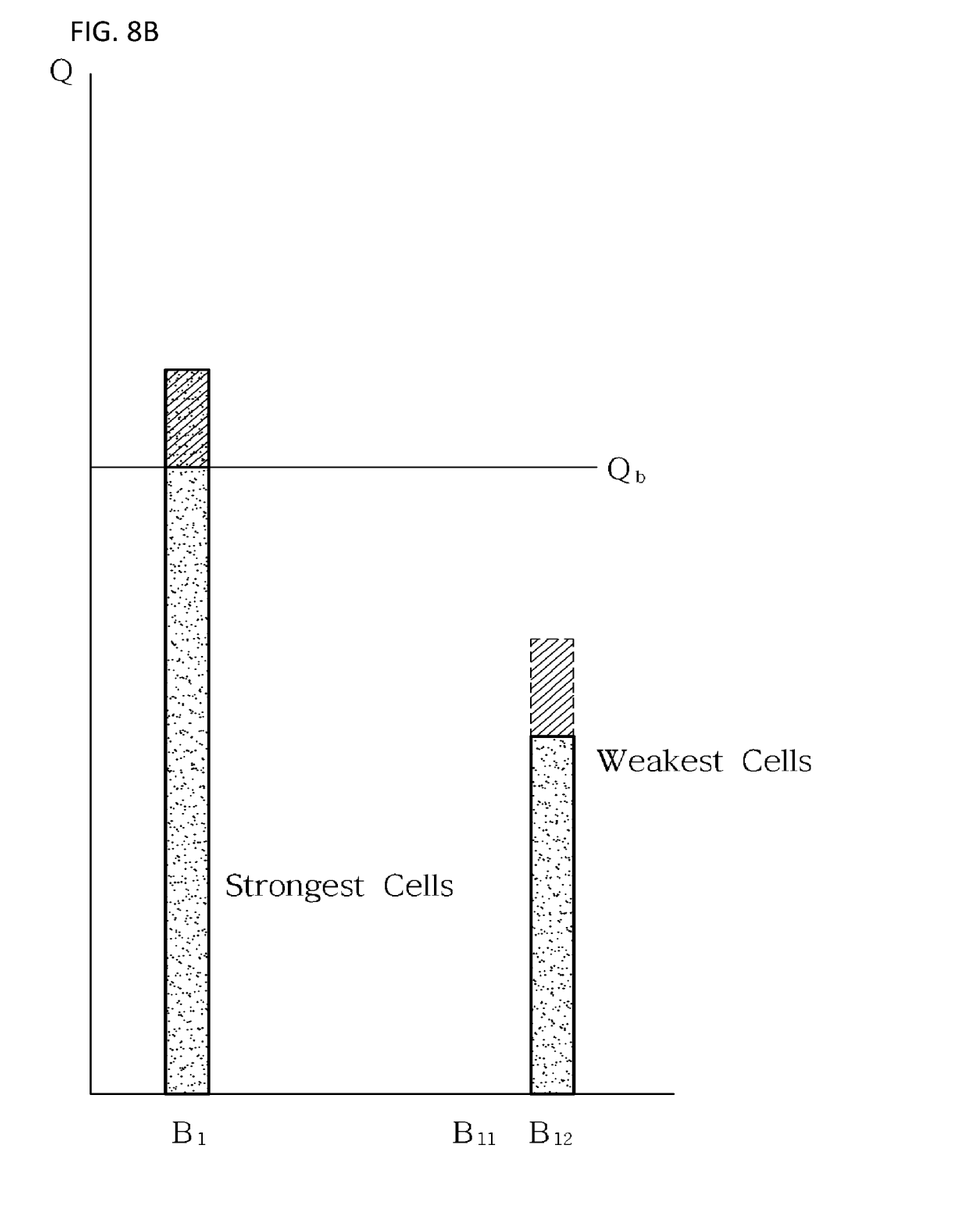
FIG. 8B is a diagram illustrating an example in which the charge of the strong battery cell is closer to the balancing charge than the charge of the weak battery cell.

For another example, when the charge $Q_1$ of the strong battery cell $B_1$ is closer to the balancing charge $Q_b$ than the charge $Q_{12}$ of the weak battery cell $B_{12}$ as illustrated in FIG. 8B, the strong balancing mode is selected to perform a balancing operation only until the charge $Q_1$ of the weak battery cell $B_1$ reaches the balancing charge $Q_b$.

When the charges of the battery cells $B_1$ to $B_{12}$ are sorted in descending order as illustrated in FIG. 7, it may indicate that the battery cell $B_1$ stores the highest charge $Q_1$ and the battery cell $B_{12}$ stores the lowest charge $Q_{12}$.

Thus, when $\eta_e(Q_1-Q_b)$ obtained by multiplying $(Q_1-Q_b)$ by the charge transfer efficiency is larger than $(Q_b-Q_{12})$ under the condition where $(Q_1-Q_b)$ is larger than $(Q_b-Q_{12})$, it corresponds to the case in which the charge $Q_{12}$ of the battery cell $B_{12}$ is closer to the balancing charge $Q_b$ than the charge $Q_1$ of the battery cell $B_1$ as illustrated in FIG. 8A. Furthermore, when $\eta_e(Q_1-Q_b)$ is smaller than $(Q_b-Q_{12})$, it corresponds to the case in which the charge $Q_1$ of the strong battery cell $B_1$ is closer to the balancing charge $Q_b$ than the charge $Q_{12}$ of the weak battery cell $B_{12}$ as illustrated in FIG. 8B.

According to the comparison result between $\eta_e(Q_1-Q_b)$ and $(Q_b-Q_{12})$, a first balancing time $t_{B1}$ during which the balancing operation is to be performed is calculated through Equation 3 below, and a second balancing time $t_{B2}$ is calculated through Equation 4 below, at steps ST10 and ST11.

That is, the balancing time is calculated by dividing the total charge to be transferred by an average current to be transferred or received. When the charge $Q_{12}$ of the battery cell $B_{12}$ is closer to the balancing charge $Q_b$ than the charge $Q_1$ of the battery cell $B_1$ according to the comparison result between $\eta_e(Q_1-Q_b)$ and $(Q_b-Q_{12})$, the first balancing time $t_{B1}$ is calculated through Equation 3 below.

$$t_{B1} = \frac{Q_b - Q_{12}}{\eta_e i_{S,avg}} \quad \text{[Equation 3]}$$

Furthermore, when the charge $Q_1$ of the battery cell $B_1$ is closer to the balancing charge $Q_b$ than the charge $Q_{12}$ of the battery cell $B_{12}$ according to the comparison result between $\eta_e(Q_1-Q_b)$ and $(Q_b-Q_{12})$, the second balancing time $t_{B2}$ is calculated through Equation 4 below.

$$t_{B2} = \frac{Q_1 - Q_b}{i_{S.avg}} \quad \text{[Equation 4]}$$

In Equation 3, $i_{S.avg}$ represents the average balancing current of the strong battery cells, and the current $i_{S.avg}$ is transferred to a weak battery cell at the charge transfer efficiency of $\eta_e$. Thus, the current received by the weak battery cell becomes $\eta_e i_{S.avg}$.

Then, based on the balancing times $t_{B1}$ and $t_{B2}$, a strong battery cell (for example, $B_1$) and a corresponding weak battery cell (for example, $B_{12}$) are selected to perform a balancing operation, at step ST12.

At this time, as described with reference to FIGS. 5 and 6, the switches are selectively operated to recover (store) the charge stored in the battery cell $B_1$ into the capacitor of the series resonant circuit during the time $t_{B1}$ or $t_{B2}$, and the recovered (stored) charge is distributed (supplied) to the battery cell $B_{12}$ during the time $t_{B1}$ or $t_{B2}$.

Then, the changed charges $Q'_1$ and $Q'_{12}$ of the strong battery cell $B_1$ and the weak battery cell $B_{12}$, on which the balancing operation was performed, are calculated through Equation 5 below.

$$Q_1' = Q_1 - i_{S.avg} \times t_B$$

$$Q_{12}' = Q_{12} + \eta_e i_{S.avg} \times t_B \quad \text{[Equation 5]}$$

In Equation 5, $Q_1$ represents the previous charge of the strong battery cell, $Q'_1$ represents the current charge of the strong battery cell, $i_{S.avg}$ represents the balancing current, $t_B$ represents a balancing time, $Q_{12}$ represents the previous charge of the weak battery cell, $Q'_{12}$ represents the current charge of the weak battery cell, and $\eta_e$ represents the charge transfer efficiency.

Then, the updated battery cells are sorted based on the charges, and the strong charge $Q_s$ of the strong battery cell and the weak charge $Q_w$ of the weak battery cell are compared. When the strong charge $Q_s$ of the strong battery cell and the weak charge $Q_w$ of the weak battery cell are determined to be different from each other, the procedure proceeds to the balancing process ST8 to ST14, at steps ST14 and ST15.

For example, when the battery cells are sorted in order of the charge values as illustrated in FIG. 7 before the first balancing operation is performed and the strong battery cell $B_1$ and the weak battery cell $B_{12}$ are selected to perform a balancing operation during the balancing process ST8 to ST14, the charge of the weak battery cell $B_{12}$ reaches the balancing charge $Q_b$, and the charge value of the strong battery cell $B_1$ becomes smaller than the charge value of the strong battery cell $B_2$.

Thus, when the second balancing operation is performed, the charge of the strong battery cell $B_2$ is set to the strong charge $Q_s$, and the charge of the weak battery cell $B_{11}$ is set to the weak charge $Q_w$. Then, the balancing process ST8 to ST14 is performed. The balancing process is repeated until the strong charge $Q_s$ of the strong battery cell becomes equal to the weak charge $Q_w$ of the weak battery cell.

When it is determined at step ST15 that the strong charge $Q_s$ is equal to the weak charge $Q_w$, the standard deviation $\sigma(Q_k)$ of the battery cells is calculated and compared to the threshold $\sigma_{th}$. Then, when the standard deviation $\sigma(Q_k)$ is equal to or less than the threshold $\sigma_{th}$ according to the comparison result, the procedure proceeds to the idle mode, and when the standard deviation $\sigma(Q_k)$ exceeds the threshold $\sigma_{th}$, the procedure proceeds to step ST4 to perform the above-described process.

Thus, after the balancing charge $Q_b$ is calculated, N balancing operations may be performed for imbalance among N battery cells using the balancing charge $Q_b$, such that the charges of all the battery cells can accurately reach the condition of balance within a short time.

According to the embodiment of the present invention, when a balancing operation is performed in the battery cell balancing circuit using LC series resonance, the battery cell balancing method calculates the balancing charge for all battery cells of which charges are not equal to each other, and performs the series of balancing operations using the balancing charge, thereby reducing the balancing time and improving the balancing efficiency.

While various embodiments have been described above, it will be understood to those skilled in the art that the embodiments described are by way of example only. Accordingly, the disclosure described herein should not be limited based on the described embodiments.

What is claimed is:

1. A battery cell balancing method comprising:
   (a) comparing a standard deviation for charges of entire battery cells to a threshold, and proceeding to the next step or an idle mode according to the comparison result;
   (b) calculating balancing charge which serves as a reference value when a balancing operation is performed on the entire battery cells, based on the charges of the entire battery cells and charge transfer efficiency of a balancing circuit;
   (c) calculating a balancing time of a strong battery cell to supply charge and a balancing time of a weak battery cell to receive charge according to a comparison result between a difference between the charge of the strong battery cell storing the highest charge and the balancing charge and a difference between the charge of the weak battery cell storing the lowest charge and the balancing charge, among the charges of the entire battery cells, and performing a balancing operation; and
   (d) calculating the charge of the strong battery cell and the charge of the weak battery cell, sorting the entire battery cells based on the charges, and returning to the step (c) or (a) according to whether the charge of the strong battery cell and the charge of the weak battery cell among the charges of the sorted battery cells are equal to each other.

2. The battery cell balancing method of claim 1, wherein the step (a) comprises:
   a first step of calculating the charges of the entire battery cells, and sorting the charges from the highest charge to the lowest charge based on the calculation results;
   a second step of calculating the standard deviation of the charges of the entire battery cells, and comparing the calculated standard deviation to the predetermined threshold; and
   a third step of proceeding to the idle mode when the standard deviation is determined to be equal to or less than the threshold according to the comparison result of the second step, and proceeding to the next step when the standard deviation is determined to exceed the threshold.

3. The battery cell balancing method of claim 2, wherein at the first step,
when the charges of the entire battery cells are calculated, the charge of a k-th battery cell is calculated by multiplying the SOC (State Of Charge) of the k-th battery cell by the capacity of the k-th battery cell.

4. The battery cell balancing method of claim 1, wherein the step (b) comprises:
fourth and fifth steps of calculating the balancing charge $Q_b$ using the following equation;
a sixth step of checking whether the balancing charge $Q_b$ is smaller than the charge $Q_n$ of an n-th battery cell and larger than the charge $Q_{n+1}$ of an (n+1)th battery cell, whenever the balancing charge $Q_b$ is calculated at the fifth step, and ending the calculation operation for the balancing charge $Q_b$ at the fifth step when the condition is satisfied; and
a seventh step of increasing n in the equation at the fifth step by one whenever the condition is not satisfied at the sixth step:

$$Q_b = \frac{\sum_{k=1}^{n} Q_k \times \eta_e + \sum_{k=n+1}^{m} Q_k}{m - (1-\eta_e) \times n}$$

where $Q_k$ represents the charges of the entire battery cells, m represents the number of battery cells, n represents a natural number, and $\eta_e$ represents the charge transfer efficiency.

5. The battery cell balancing method of claim 1, wherein the step (c) comprises:
an eighth step of determining whether the difference between the charge of the strong battery cell and the balancing charge is larger than the difference between the balancing charge and the charge of the weak battery cell;
a ninth step of determining whether a value obtained by multiplying the difference between the charge of the strong battery cell and the balancing charge by the charge transfer efficiency is larger than the difference between the balancing charge and the charge of the weak battery cell, when it is determined at the eight step that the difference between the charge of the strong battery cell and the balancing charge is larger than the difference between the balancing charge and the charge of the weak battery cell;
a tenth step of calculating a first balancing time according to the comparison result of the ninth step;
a 11th step of calculating a second balancing time according to the comparison result of the ninth step; and
a 12th step of selectively selecting a strong battery cell and a weak battery cell based on the first balancing time and the second balancing time, and performing a balancing operation.

6. The battery cell balancing method of claim 5, wherein the first balancing time $t_{B1}$ and the second balancing time $t_{B2}$ are calculated through the following equations:

$$t_{B1} = \frac{Q_b - Q_m}{\eta_e i_{S,avg}}$$

$$t_{B2} = \frac{Q_1 - Q_b}{i_{S,avg}}$$

wherein $\eta_e$ represents the charge transfer efficiency, $Q_b$ represents the balancing charge, $Q_1$ represents the charge of the strong battery cell, $Q_m$ represents the charge of the weak battery cell, and $i_{S,avg}$ represents the average balancing current of the strong battery cell.

7. The battery cell balancing method of claim 5, wherein the battery cell balancing method is applied to a battery cell balancing circuit using LC series resonance.

8. The battery cell balancing method of claim 7, wherein the balancing operation of the 12th step comprises:
recovering a part of the charge of the strong battery cell, and storing the recovered charge in a capacitor of the battery cell balancing circuit; and
supplying the charge stored in the capacitor to the weak battery cell.

9. The battery cell balancing method of claim 1, wherein the step (d) comprises:
a 13th step of calculating the charge of the strong battery cell and the charge of the weak battery cell;
a 14th step of sorting the entire battery cells in descending order, based on the charges; and
a 15th step of checking whether the charge of the strong battery cell is equal to the charge of the weak battery cell, and returning to the step (c) when the charge of the strong battery cell is not equal to the charge of the weak battery cell, or returning to the step (a) when the charge of the strong battery cell is equal to the charge of the weak battery cell.

10. The battery cell balancing method of claim 9, wherein the 13th step is performed based on the following equations:

$Q_1' = Q_1 - i_{S,avg} \times t_B$ $Q_m' = Q_m + \eta_e i_{S,avg} \times t_B$ $Q_1$ represents the previous charge of the strong battery cell, $Q_1'$ represents the current charge of the strong battery cell, $i_{S,avg}$ represents the average balancing current of the strong battery cell, $t_B$ represents a balancing time, $Q_m$ represents the previous charge of the weak battery cell, $Q_m'$ represents the current charge of the weak battery cell, and $\eta_e$ represents the charge transfer efficiency.

11. The battery cell balancing method of claim 1, wherein at the step (d), the entire battery cells are sorted in descending order, based on the charges.

* * * * *